(12) United States Patent
Martin

(10) Patent No.: US 6,386,551 B1
(45) Date of Patent: May 14, 2002

(54) PLASTIC SLEEVE AND METHOD OF MANUFACTURING THE SAME

(75) Inventor: Jon W. Martin, Loudon, TN (US)

(73) Assignee: TRW Inc., Lyndhurst, OH (US)

( * ) Notice: Subject to any disclaimer, the term of this patent is extended or adjusted under 35 U.S.C. 154(b) by 0 days.

(21) Appl. No.: 09/564,654

(22) Filed: May 3, 2000

Related U.S. Application Data

(63) Continuation-in-part of application No. 08/811,672, filed on Mar. 5, 1997.

(51) Int. Cl.$^7$ ............................................. F16J 3/00
(52) U.S. Cl. ..................................... 277/634; 277/635
(58) Field of Search ................................ 277/391, 634, 277/635; 464/173, 175; 403/50, 51

(56) References Cited

U.S. PATENT DOCUMENTS

| | | | |
|---|---|---|---|
| 3,017,302 A | | 1/1962 | Hultkrans |
| 3,086,242 A | | 4/1963 | Cook et al. |
| 3,213,764 A | | 10/1965 | Nelson et al. |
| 4,247,584 A | | 1/1981 | Widiger et al. |
| 4,560,178 A | | 12/1985 | Hempel |
| 4,573,693 A | | 3/1986 | Nakata et al. |
| 4,892,765 A | | 1/1990 | Hisazumi et al. |
| 4,895,550 A | | 1/1990 | Baker |
| 4,967,609 A | | 11/1990 | Takagi et al. |
| 5,078,652 A | | 1/1992 | Baker |
| 5,094,894 A | | 3/1992 | Schafferus et al. |
| 5,098,344 A | * | 3/1992 | Zollinger .................... 464/175 |
| 5,145,191 A | * | 9/1992 | Stewart et al. .......... 464/175 X |
| 5,249,814 A | | 10/1993 | Halling |

FOREIGN PATENT DOCUMENTS

| | | |
|---|---|---|
| CA | 2083580 | 5/1994 |

OTHER PUBLICATIONS

Publication by Eastman Chemical Company, ECDEL elastomers, Products and Packaging for the Medical Industry, publication PPM–201B, Jan., 1999.

* cited by examiner

*Primary Examiner*—Robert J. Sandy
*Assistant Examiner*—Karlena D. Schwing
(74) *Attorney, Agent, or Firm*—Tarolli, Sundheim, Covell, Tummino & Szabo L.L.P.

(57) ABSTRACT

The present invention resides in a boot seal for use in sealing a joint. The joint comprises first and second relatively movable parts. The boot seal is configured in the form of a sleeve to extend between and around the vehicle relatively movable parts. The sleeve has a laminate wall which comprises at least two layers of thermoplastic elastomeric material which are bonded together. At least one of the layers is a stretch-toughenable polyester thermoplastic elastomer which has been diametrically stretched in an amount effective to increase the toughness of said one layer. The laminate wall has a percent elongation to rupture of at least 100, and a flexural modulus which is less than 100,000 psi. The laminate wall preferably has a puncture resistance of at least 50 Newtons/mm wall thickness.

22 Claims, 6 Drawing Sheets

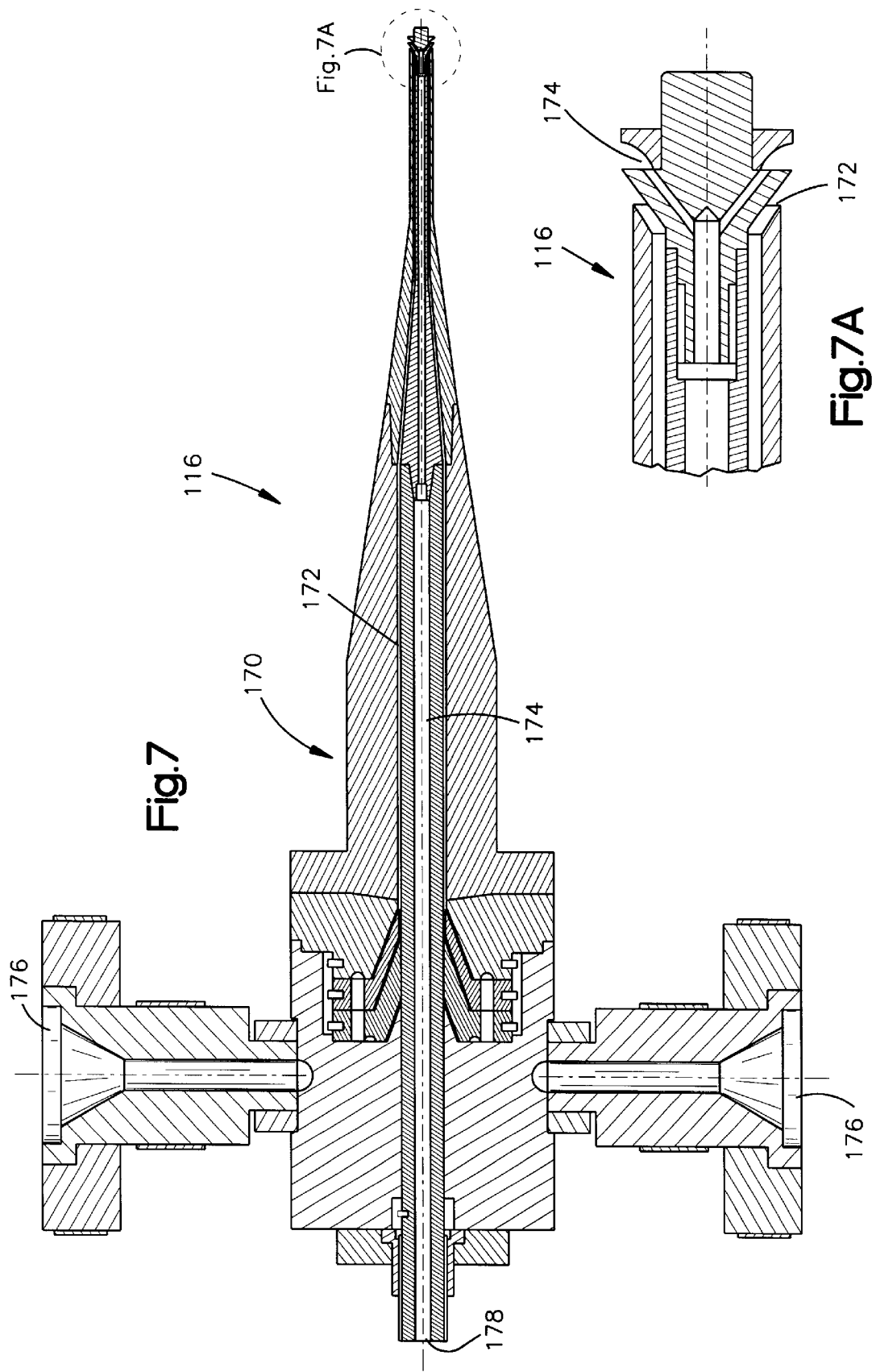

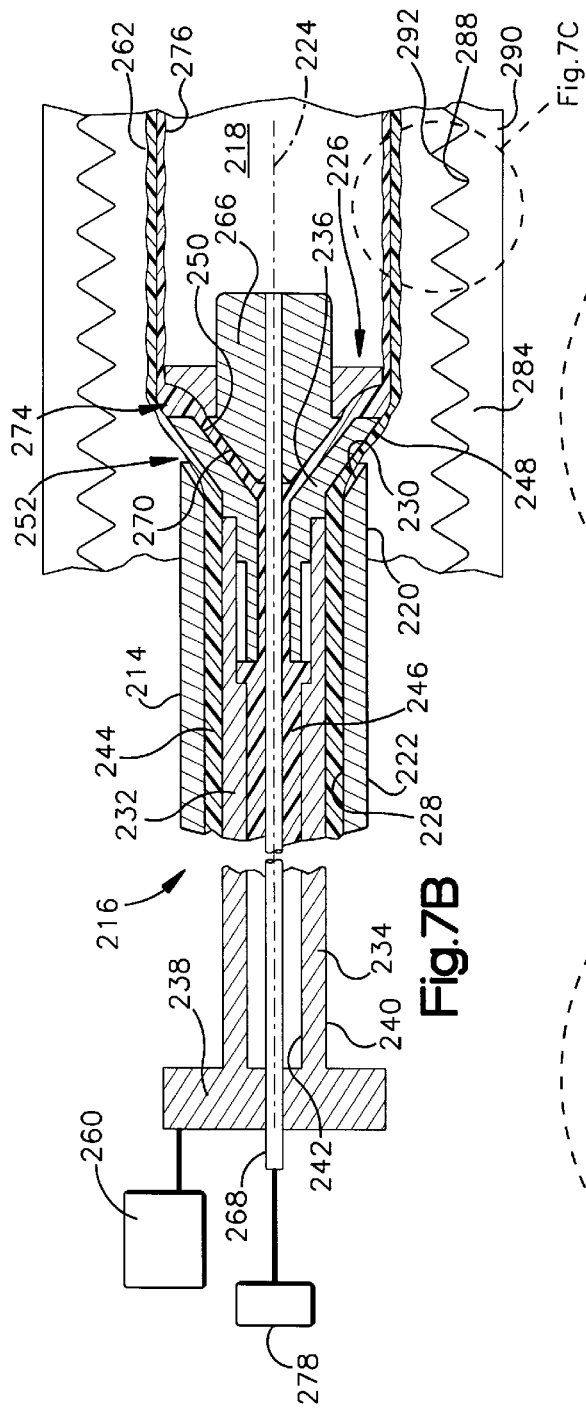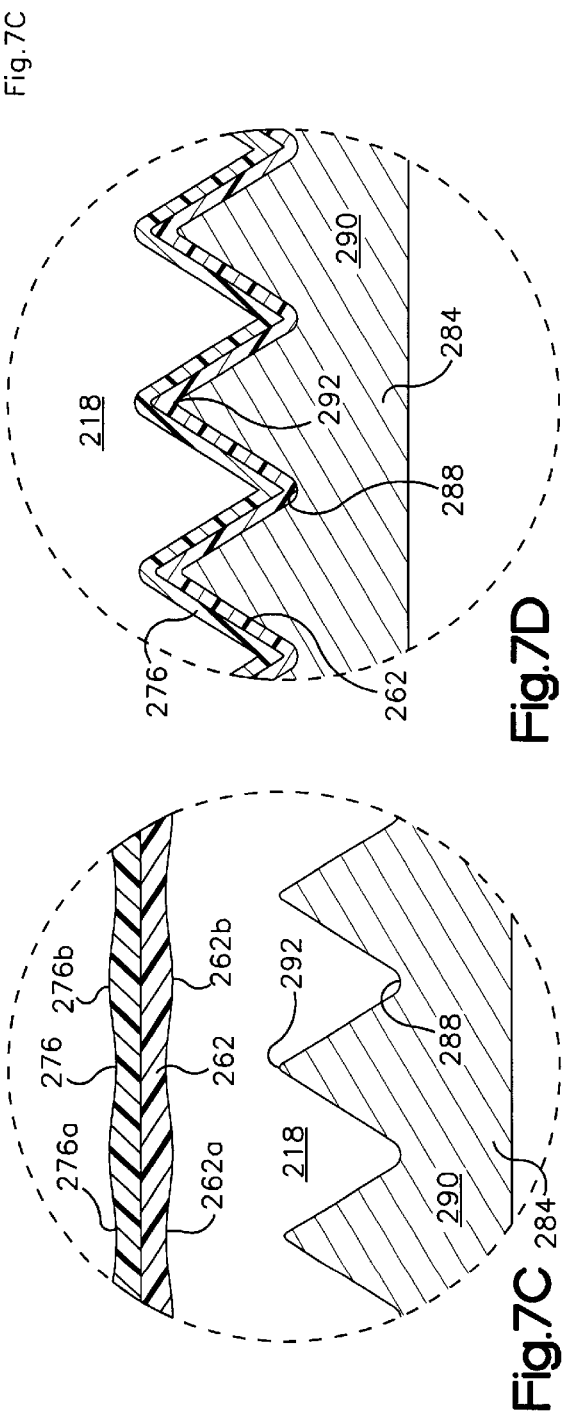

PLASTIC SLEEVE AND METHOD OF MANUFACTURING THE SAME

This application is a continuation-in-part of application Ser. No. 08/811,672, filed Mar. 5, 1997, and assigned to the assignee of the present application.

FIELD OF THE INVENTION

The present invention relates to a vehicle steering or suspension system, and particularly relates to a boot seal for sealing a movable joint in a vehicle steering or suspension system.

BACKGROUND OF THE INVENTION

Boot seals are used to protect the bearings in joints between relatively movable parts of vehicle steering and suspension systems. The boot seals are typically formed of a thermoplastic or thermosetting elastomer. Examples of prior art elastomers are neoprene rubber, a blend of ethylene-propylene rubber and polypropylene marketed by Monsanto Company of St. Louis, Mo. under the trademark SANTOPRENE, and HYTREL polyester marketed by E.I. DuPont de Nemours Co.

The boot seals are typically blow molded into the configuration in which they are to be installed, and are snapped into place in an interference fit which is secured by metal clips.

Boot seal failure can be caused by fatigue, punctures, cuts or tears, and abrasive wear. Boot seal failures are a common cause of joint failure. If a boot seal fails, water and dirt can get into the joint, and/or grease can leak out. It is desirable to increase the resistance of boot seals to failure.

SUMMARY OF THE INVENTION

The present invention resides in a boot seal for use in sealing a joint. The joint comprises first and second relatively movable parts. The boot seal is in the form of a sleeve which extends between and around the vehicle relatively movable parts. The sleeve has a laminate wall which comprises at least two layers of thermoplastic elastomeric material which are bonded together. At least one of the layers is a stretch-toughenable polyester thermoplastic elastomer which has been diametrically stretched in an amount effective to increase the toughness of the one layer. The laminate wall has a percent elongation to rupture of at least 100, and a flexural modulus which is less than 100,000.

Preferably, the laminate wall has a puncture resistance of at least 50 Newtons/mm wall thickness.

Preferably, the stretch toughened one layer is a stretch-toughenable polyester material which is resistant to dimensional change when exposed to heat.

Preferably, the boot seal is a laminate of a first outer layer which is formed of a stretch-toughened polyester material and a second inner layer which is formed of a thermoplastic elastomer, wherein the outer layer polyester material has a generally higher degree of toughness and a greater resistance to hydrocarbon chemicals than the inner layer thermoplastic elastomer, and wherein the inner layer thermoplastic elastomer has a higher degree of flexibility and softness than the outer layer polyester thermoplastic material.

In an embodiment of the present invention, the inner layer thermoplastic elastomer is a polyolefin.

The present invention also resides in a process for making a boot seal. Two thermoplastic elastomeric raw materials are obtained and fed separately into an extruder. The raw materials are separately extruded from the extruder as coaxial tubular molten streams having an outside diameter $D_1$ into a mold cavity comprising a corrugated inner wall having an inside diameter $D_2$. The molten streams of thermoplastic elastomeric material are vacuum expanded against the mold cavity inner wall and then cooled to a semi-solid state while vacuum held against the mold cavity inner wall. The amount of expansion ($D_2/D_1$) preferably is in the range of about 200% to about 700%. One of the raw materials is a polyester thermoplastic elastomer which is stretch toughenable by said vacuum expansion and which when cooled has a percent elongation to rupture of at least 100 and a flexural modules less than 100,000 psi.

The boot seal preferably has a puncture resistance of at least 50 Newtons/mm thickness of the boot seal.

The thicknesses of the molten streams of thermoplastic elastomeric material are preferably controlled to achieve a boot seal wall thickness in the range of about 0.6 to about 2 mm.

In a preferred embodiment of the present invention, the mold cavity is defined by an endless series of movable molds, each mold having an open clamshell configuration prior to the point of extrusion, and a closed clamshell configuration after extrusion, the extrusion being continuous.

BRIEF DESCRIPTION OF THE DRAWINGS

The foregoing and other features of the present invention will become apparent to one skilled in the art to which the present invention relates upon consideration of the following description of the invention with reference to the accompanying drawings, in which:

FIG. 7 is an enlarged detailed sectional view of an extruder die in accordance with an embodiment of the present invention;

FIG. 7A is an enlarged detailed sectional view of the extruder head of the extruder die of FIG. 7;

FIG. 7B is an enlarged detailed sectional view of a variable nozzle extruder head in a forming apparatus;

FIG. 7C is an enlarged sectional view of a portion of FIG. 7B;

FIG. 7D is the enlarged sectional view of FIG. 7C following vacuum forming; and

DESCRIPTION OF ONE SPECIFIC PREFERRED EMBODIMENT OF THE INVENTION

Figure 1:
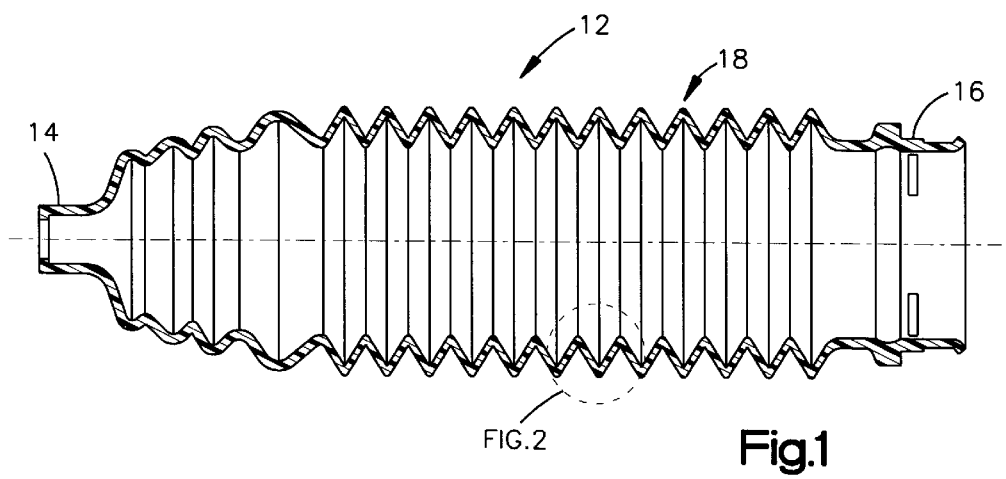
FIG. 1 is a sectional view of a boot seal in accordance with the present invention.

Referring to FIG. 1, the boot seal 12 of the present invention is a sleeve-like member formed of a flexible thermoplastic material. The boot seal 12 has a small diameter first end 14 and a larger diameter second end 16. The boot seal 12 between ends 14 and 16 has an intermediate portion 18 which is corrugated. The diameters of the first and second ends and the distances between the peaks and valleys of the corrugations are not critical, and are dictated by the particular dimensions of the application with which the boot seal is used.

Figure 2:
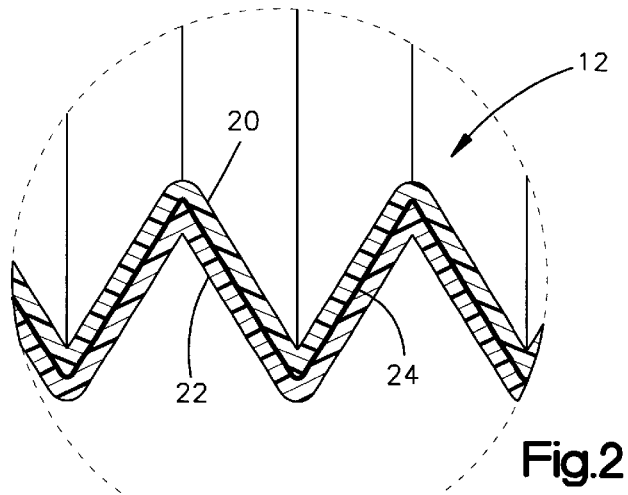
FIG. 2 is an enlarged sectional view of a portion of the boot seal of FIG. 1.

FIG. 2 shows that the boot seal 12 has a laminate construction comprising a first ply 20, a second ply 22, and an adhesive bonding layer 24 between the first and second plies 20 and 22. The adhesive bonding layer 24 is optional and dependent upon the compositions of the elastomeric materials used in the first and second plies 20 and 22. Certain plastics when in a molten state can bond together without the need of an intermediate adhesive bonding layer. This laminate construction extends the full length of the boot seal 12.

Figure 3:
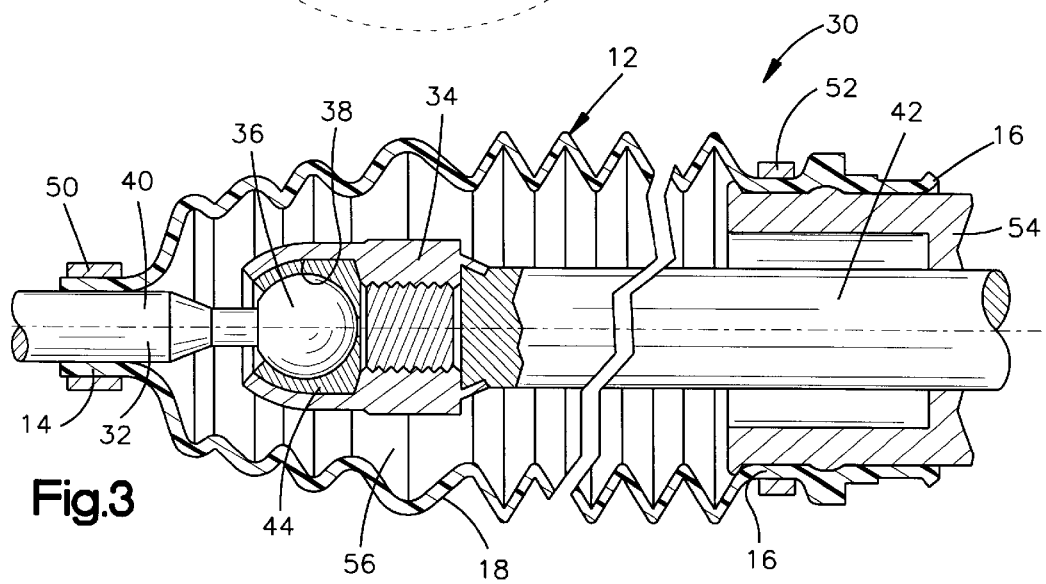
FIG. 3 is a partial sectional broken view of a movable joint of a vehicle steering system employing the boot seal of FIG. 1.

The boot seal 12 of FIG. 1 is particularly useful with a ball and joint construction for a vehicle steering or suspension apparatus 30, as illustrated in FIG. 3. Referring to FIG. 3, the apparatus 30 comprises a ball stud 32 and a housing 34. The stud 32 has a ball end 36 located in a socket 38 of the housing 34. The stud 32 further has a shank 40 projecting longitudinally from the ball end 36. The shank 40 is connectable with a movable part of a vehicle steering or suspension apparatus in a known manner. The housing 34 has a shank 42 which is connectable with another movable part of the steering or suspension apparatus in a known manner. A bearing 44 is located in the socket 38, and supports the ball end 36 of the stud 32 for limited movement relative to the housing 34.

The boot seal 12 in the form of a sleeve around the apparatus 30 shields the bearing 44, the housing 34, and the ball end 36 of the stud 32 from dirt and other foreign substances. A first clamp 50 holds the small end 14 of the boot seal 12 firmly against the stud shank 40. A second clamp 52 similarly holds the large end 16 of the boot seal 12 firmly against a seal ring 54 which is operatively associated with housing shank 42. The flexible intermediate portion 18 of the boot seal 12 deflects between the boot seal ends 14 and 16 upon movement of the ball stud 32 relative to the housing 34. The relative movement is pivotable but can also be longitudinal to a limited extent depending upon the particular design of the steering or suspension apparatus. A lubricant (not shown) for the bearing 44, such as grease or the like, may be contained within the space 56 enclosed by the intermediate portion 18 of the boot seal 12.

The corrugated boot seal 12 (FIGS. 1 and 2) is formed of a laminated flexible thermoplastic elastomeric material. Preferably, the boot seal laminate structure, shown in FIG. 2, in one embodiment of the present invention, comprises an inner ply 20 which may be formed of a selected thermoplastic for flexibility and softness. The outer ply 22 is formed of a polyester thermoplastic elastomer for toughness and resistance to hydrocarbon chemicals.

A preferred polyester thermoplastic elastomer for the outer ply 22 is a copolyester resin marketed by Eastman Chemical Products, Inc. under the trademark ECDEL. ECDEL is believed to be a cycloaliphatic thermoplastic copolyester (a copolyester-ether); more specifically, a condensation product of the trans isomer of 1,4-dimethyl-cyclohexanedicarboxylate units, of cyclo-hexanedimethanol units and hydroxy terminated polytetramethylene ether glycol units. It is related to polyethylene terephthalate (PET).

A preferred grade of ECDEL for the present invention is 9967. ECDEL 9967 has a melt temperature of 205° C. to 230° C. (400° F. to 445° F.).

ECDEL 9967 is related to and has many of the same properties as polyethylene terephthalate (PET). Polyethylene terephthalate (PET) is stretch-toughenable which makes it suitable for use in the manufacture of blow molded bottles. Primarily, ECDEL 9967 is also stretch-toughenable. Stretching the plastic, for instance about 200% to about 700%, allows the formation of thinner, more uniform side walls, but in addition causes a molecular orientation in the plastic which dramatically increases the strength and barrier properties of ECDEL 9967.

Unlike polyethylene terephthalate (PET), however, ECDEL was found to have more flexibility. Stretched polyethylene terephthalate (PET) is a very rigid material, as it has to be for use in blow molded bottles. Its flexural modulus (as determined by ASTM method D790) is about 450,000 psi. ECDEL 9967 in contrast has a flexural modulus of about 21,750 psi.

ECDEL 9967, in addition, has other beneficial properties. It has a percent elongation to break of about 400. The percent elongation to break is determined using ASTM method D638. In this test, specimens about 3 mm (⅛ in.) thick are tested using a crosshead speed of 508 mm (20 in.) per min. The percent elongation test is conducted at about 23° C. (73° F.) and 50% RH.

The flexibility and stretchability of ECDEL 9967 make this polyester particularly useful for the manufacture of boot seals.

ECDEL 9967 also has and a high degree of puncture resistance (PR) depending upon the amount stretched.

The resistance to puncture is measured on 50 mm×50 mm (2×2 inch) specimens of boot seal samples using a load cell and a steel rod probe. The probe has a working end which is finished to a radius of 3.28 mm (0.134 inch). The load cell is assembled with an Instron tensile testing machine. A 760 gram ram is allowed to free fall 400 mm to force the test samples to be punctured by the steel rod probe. The maximum tensile force exerted by the probe free fall on the specimens is recorded in Newtons. This force is divided by the wall thickness (the minimum wall thickness if the specimen wall thickness varies), to obtain the puncture resistance.

Extrusion molded samples of ECDEL stretched about 320% were found to have a puncture resistance of about 130 to about 150 Newtons per mm. Even moderate stretching of about 20% was found to provide beneficial stretch properties.

There are a number of thermoplastic polymers that are stretch-toughenable. For instance, polyethylene terephthalate (PET) mentioned above, and also polypropylene, styrene acrylonitrile and polyvinyl chloride (PVC) are stretch-toughenable. However, polypropylene and styrene acrylonitrile, as with polyethylene terephthalate (PET), are very stiff following stretching and have flexural moduli of about 245,000 and 490,000 psi, respectively. Polyvinyl chloride following stretching retains some flexibility, but its percent elongation properties prevent it from being used successfully in boot seal applications.

Based on the above information and other data, it has been determined that the laminated boot seals of the present invention should be made using at least one ply of a stretch-toughenable polyester thermoplastic elastomer in which the boot seal is stretched an amount effective to achieve a puncture resistance of at least 50 Newtons/mm wall thickness, the elastomer at the same time having a flexural modulus which is less than 100,000 psi and a percent elongation to rupture of at least 100.

The inner ply 20 of the boot seal 12 preferably is a material which is softer than the outer ply 22. A softer inner ply 20 better accommodates surface micro-roughness and imperfections of the linkage with which the boot seal 12 is used, thereby improving the sealability of the seals 12 with the linkage. A preferred inner ply is a polyolefin. Polyolefins also have more flexibility than polyesters. This enhances the flexibility of the boot seal 12.

A preferred polyolefin for the inner ply is a polyether resin marketed by Eastman Chemical Products, Inc. under the trademark MXSTEN. This polyolefin is a polyethylene resin used primarily in the packaging field. However, other polyolefins which are extrusion moldable, or any flexible extrudable film forming material which is soft and bondable with a polyester resin such as a polyurethane, can be used as the inner ply 20.

An advantage in the use of MXSTEN is that it is stretch toughenable similar to ECDEL.

The inner ply 20 need not be a polyolefin or similar soft extrudable material, such as a polyurethane. For instance, boot seals in accordance with the present invention can be made wherein both plies 20 and 22 are ECDEL polyester. However, this may require linkage surfaces essentially free of surface micro-roughness.

It is also possible to use an inner ply 20 of ECDEL wherein the ECDEL is blown or sponged. This is accomplished using conventional blowing agents and procedures. By using blown ECDEL in the inner ply 20, the inner ply is made softer so that it has softness properties similar to those of a polyolefin. Thus, it is usable with surfaces having micro-roughness and imperfections. At the same time, the inner ply 20 has strength properties of stretch-toughened ECDEL.

Similarly, the outer ply 22 need not be 100% polyester thermoplastic elastomer. Boot seals in accordance with the present invention have been successfully made wherein the outer ply 22 contains a substantial weight percentage MXSTEN. The ECDEL present in the outer ply 22 even in small amounts, when stretch-toughened, offers superior puncture resistance.

The advantage in incorporating an amount of MXSTEN in the outer ply 22 as well as in the inner ply 20 is that it enhances the bonding strength of the outer ply 22 to the inner ply 20.

When the outer ply 22 is substantially a polyester thermoplastic elastomer and the inner ply 20 is substantially a polyolefin, it may be desirable to co-extrude with the plies 20 and 22 an intermediate adhesive bonding layer, designated layer 24 in FIG. 2. Suitable extrudable thermoplastic adhesives are well known. One is TIE BOND TL-905 marketed by Shell Chemical Company. Another is ADMER QB520A marketed by Mitsui Chemical Company. When both plies 20 and 22 contain compatible plastics, for instance substantial amounts of MXSTEN in both plies, or substantial amounts of ECDEL in both plies, then no adhesive may be necessary. The plies may be self-bonding.

Figure 4:
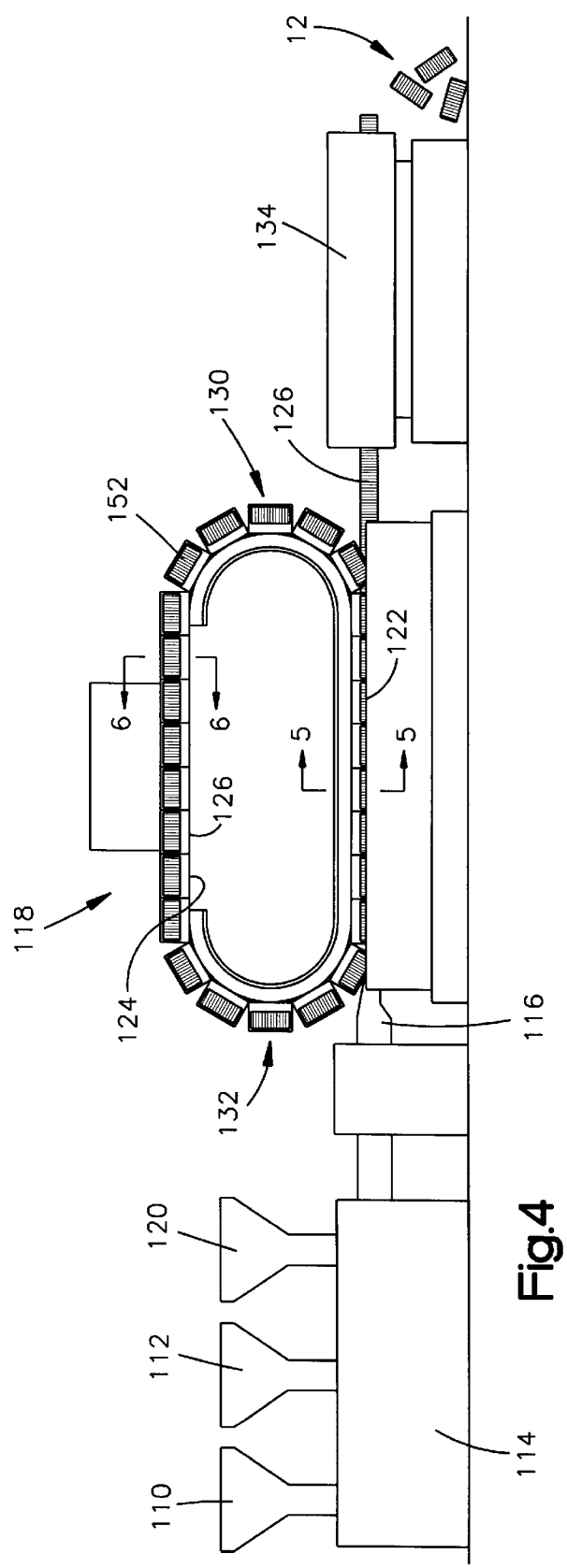
FIG. 4 schematic elevation view of a forming apparatus for making the boot seal of FIG. 1.

The corrugated boot seal 30 preferably is formed in a continuous extrusion/molding process as disclosed in FIG. 4. Both ECDEL and MXSTEN are extrudable plastics. The process of FIG. 4 will be described for the manufacture of a laminate comprising an outer ply of ECDEL and an inner ply of MXSTEN, bonded together by an adhesive bonding layer. Referring to FIG. 4, the ECDEL resin is fed into one hopper 110 for introduction into the process, and MXSTEN resin is fed into a second hopper 112 for introduction into the process. The resins flow to a heated extruder 114 in separate chambers (not shown in FIG. 4), and then as separate flows of molten plastic into an extruder die 116. The extruder die 116 comprises concentric separate pathways, to be described, which introduce concentric layers of molten plastic into a corrugator 118.

Simultaneous with the above steps, an adhesive is fed into a third hopper 120, and from there into the heated extruder 114 for flow through the extruder die 116 as a molten stream between the concentric layers of ECDEL and MXSTEN.

The corrugator 118 is a continuous vacuum corrugator manufactured by Cullom Machine Tool & Die, Inc. of Cleveland, Tenn. The machine is disclosed in U.S. Pat. Nos. 4,439,130 and 5,257,924 incorporated by reference herein. Cullom Machine Tool & Die, Inc. is also the owner of U.S. Pat. Nos. 4,486,929; 4,718,844; 5,494,430; 5,645,871; 5,059,109; 5,489,201; and 5,531,583; all disclosing subject matter relating to that of the '130 and '924 patents, also incorporated by reference herein. Another patent containing relevant subject matter is 4,319,872 incorporated by reference herein.

The corrugator 118 comprises a continuous series of mold blocks 152 which travel in a counterclockwise direction, in the view of FIG. 4, on an inner track 124. The track 124 has a forward run 122 which extends from near the extruder 116 for essentially the full length of the lower area of the corrugator, and a return run 126 which extends for essentially the full length of the upper area of the corrugator. The corrugator 118 comprises transition areas 130 and 132 between the forward and return runs 122 and 124.

As shown in FIG. 4, molded plastic tubing 126 exits continuously from the forward run 122 and is passed to a cutter 134 which cuts the tubing into boot seals 12 of desired lengths.

Figure 5:
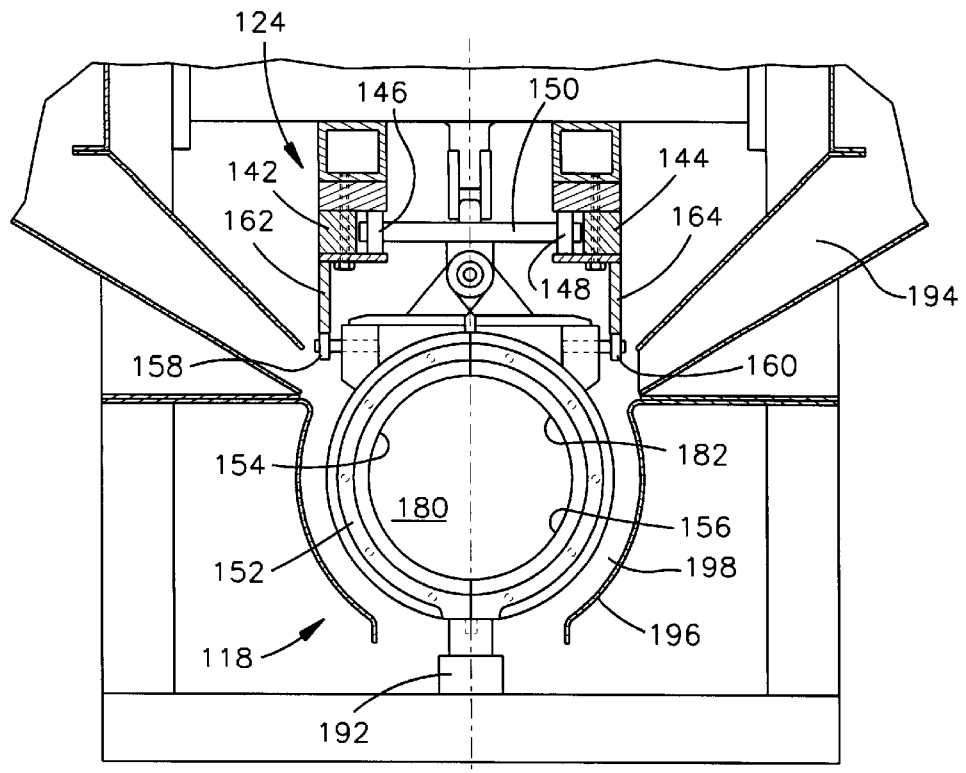
FIG. 5 is an enlarged detailed section view taken along line 5—5 of FIG. 4.
Figure 6:
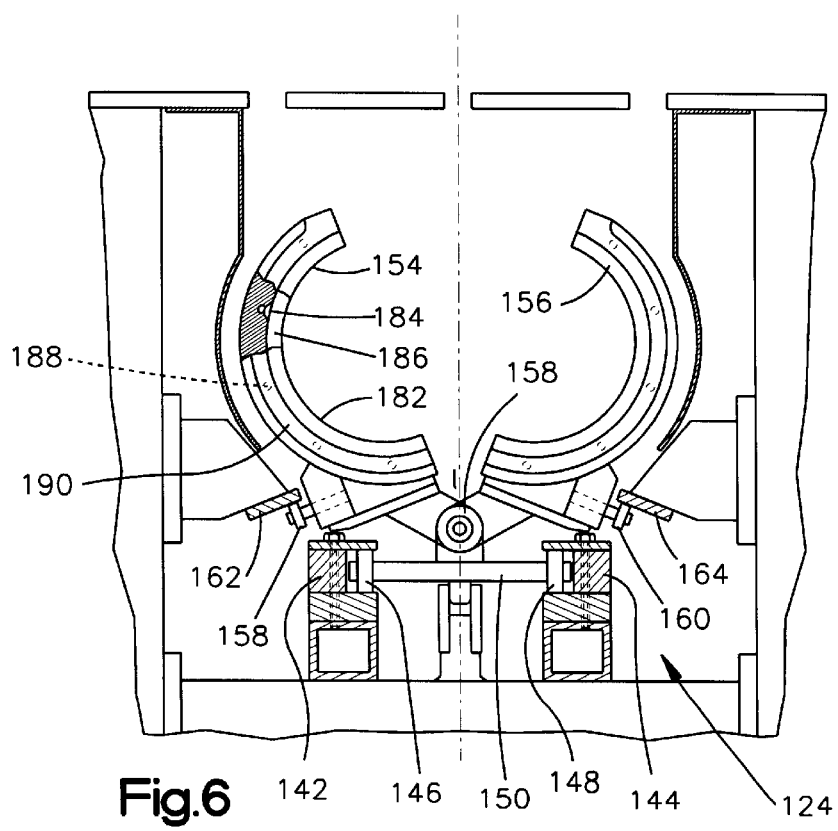
FIG. 6 is an enlarged detailed section view taken along line 6—6 of FIG. 4.

Further details of the corrugator 118 are shown in FIGS. 5, 6 and 7.

Referring to FIG. 5, which is an enlarged, detailed section view of the corrugator 118 in the forward run 122 (FIG. 4), the track 124 of corrugator 118 (FIG. 5) comprises a pair of internal rails 142 and 144 that extend continuously around the inside of the corrugator 118. Carriage rollers 146 and 148 are received into the rails 142 and 144. The carriage rollers 146 and 148 are mounted on the ends of a shaft 150 which in turn supports mold block 152. Multiple mold blocks 152 are connected together in a continuous series around the corrugator, as shown in FIG. 4. The mold blocks 152 are each comprised of clam-shaped mold halves 154 and 156. In FIG. 5, the mold halves 154, 156 are in a closed position with the halves being brought together by the camming action of guide rollers 158 and 160 against cam surfaces 162 and 164.

Referring to FIG. 6, which is an enlarged, detailed section view of the corrugator 118 in the return run 126 (FIG. 4), the clam-shaped mold halves 154 and 156 are pivoted apart, on pivot center 158 (FIG. 6), so that each mold block 152 is in an open position. In FIG. 6, the mold halves 154 and 156 are pivoted into the open position by cam surfaces 162 and 164 acting on guide rollers 158 and 160.

Referring back to FIG. 4, the mold halves 154 and 156 are in the closed position of FIG. 5 for essentially the full extent of the forward run 122, and in the open position of FIG. 6 for essentially the full extent of the return run 126. In the transition areas 130 and 132, the mold halves pivot from the closed position of FIG. 5 to the open position of FIG. 6, and vice versa, respectively.

Details of one embodiment of the extruder die 116 are shown in FIG. 7. The extruder die 116 in the embodiment of FIG. 7 is adapted for the co-extrusion of two layers, an inner ply 20 and an outer ply 22. Instead of two layers, the extruder die 116 can be adapted readily for the extrusion of three layers which would include an intermediate adhesive bonding layer 24 between the inner and outer plies 20 and 22.

Referring to FIG. 7, the extruder die 116 comprises a die block 170. The die block has a first passageway 172 for the outer ply 22, and a second passageway 174 for the inner ply 20. Passageways 172 and 174 are coaxial. Molten plastic introduced in ports 176 feeds the first passageway 172 and molten plastic introduced into port 178 feeds the second passageway 174.

Referring to FIG. 7A, it can be seen how coaxial molten plastic streams exit from the first and second passageways 172 and 174 of the extruder die 116.

Figure 8:
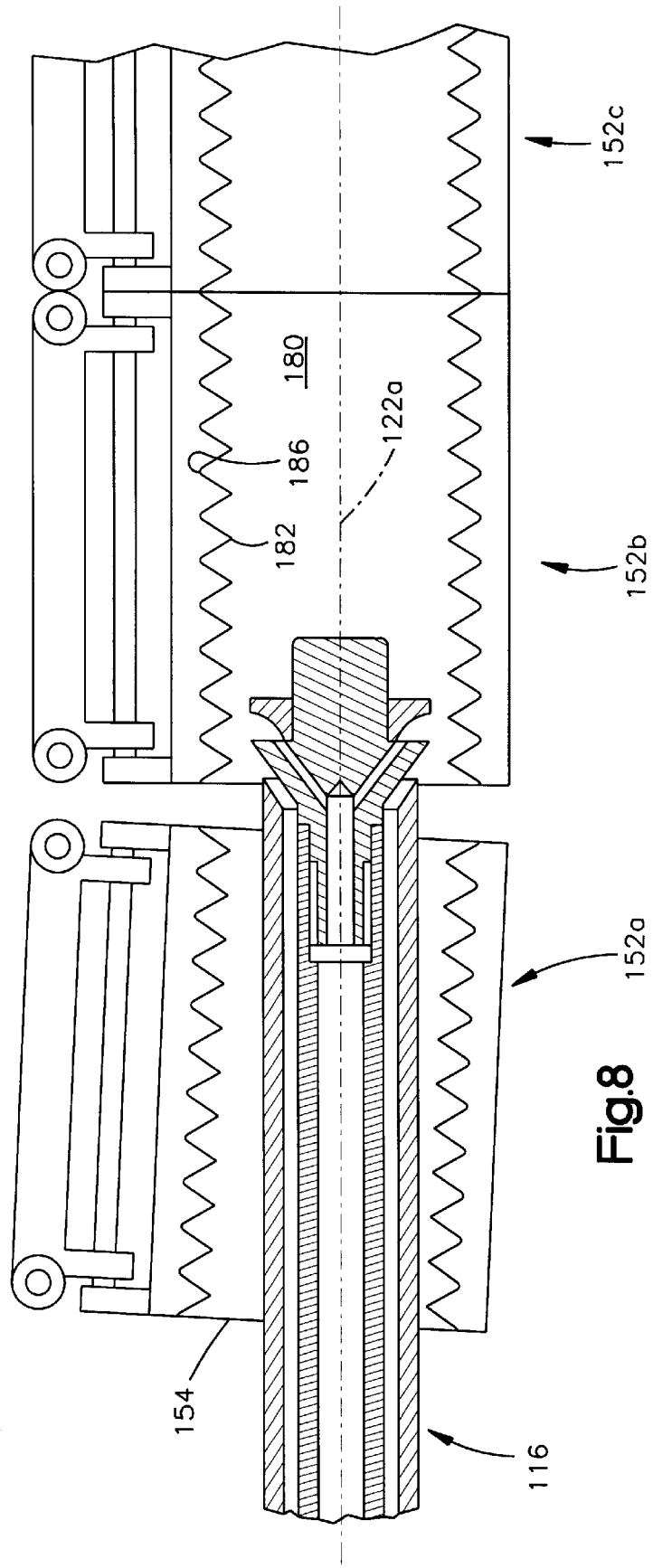
FIG. 8 is a schematic illustration showing interaction of the extruder of FIG. 7 with a portion of the forming apparatus of FIG. 4.

FIG. 8 shows the interaction of the extruder die 116 with mold blocks 152. Portions of three mold blocks 152 are shown in FIG. 8, from left to right, mold blocks 152a, 152b, and 152c. In the closed position of FIG. 5, the clam-shaped mold halves 154 and 156 are closed to define a mold cavity 180. The leftmost mold block 152a is cammed to an open position so that the clam-shaped mold halves 154 and 156 (invisible in FIG. 8) embrace the extruder 116 which extends axially into the corrugator forward run 122 (FIG. 4), on axis 122 a (FIG. 8) of the forward run. The mold block 152b is cammed to a partially closed position, and mold block 152c to a fully closed position. Molten plastic is introduced into the mold block cavity 180 when the clam-shaped mold halves 154 and 156 are nearly fully closed.

When the mold blocks 152 are fully closed, a vacuum is drawn in the mold block inner wall 182 (FIGS. 5 and 8) to expand the extruded plastic diametrically against the inner wall 182. The mold block halves 154 and 156 have a plurality of slits 184 (FIG. 6) disposed in the grooves 186 (FIG. 6) of the corrugated inner walls 182 thereof. Each of the slits 184 communicates with one of a plurality of bores 188. The bores 188 extend longitudinally through the mold halves 154 and 156 and communicate with a continuous circular vacuum header 190 (FIG. 6). The vacuum header 190 is, in turn, in communication with a vacuum manifold 192 (FIG. 5) which is maintained under vacuum. This communication is maintained for the entire lower run of the corrugator along which the mold blocks 152 are cammed to a closed position. The vacuum transmitted to the slits 184 of the mold halves 154 and 156 expands the extruded tube of plastic outwardly against the mold block inner wall 182 into the configuration of a continuous corrugated tubular member, as shown in FIG. 1.

At the point of extrusion, the thermoplastic as received is at an elevated temperature, dependent upon the plastic used, in order to make the thermoplastic pliable and susceptible to molding. It is desirable to cool the thermoplastic while it is in its expanded state. This is accomplished by means of air plenums 194 (FIG. 5) which extend along the sides of the corrugator 118, for the full length of the forward run 122. The air plenums 194 communicate with a source of pressurized air (not shown). The plenums 194 lead to a pair of arcuate shields 196 which embrace the mold blocks 152 moving in the forward run, in a spaced relationship with the mold blocks 152, to define an annular air chamber 198. Cooling air is introduced continuously into the annular air chamber 198 to cool the mold blocks 152.

The ECDEL and MXSTEN resins are particularly advantageously used in the vacuum molding process of the apparatus of FIGS. 4–8, as they are continuously extrudable, are stretch-toughenable in the vacuum expansion process, and form a rigid enough ply, when cooled, to cut.

The following examples illustrate the present invention.

EXAMPLE 1

A boot seal 12 (FIG. 1) was manufactured using the apparatus of FIGS. 4–8. The boot seal had a laminate construction comprising an outer ply of ECDEL, an inner ply of MXSTEN, and an intermediate adhesive ply marketed by Shell Chemical Company under the tradename TIE BOND TL-905.

In the manufacturing step, the pelletized materials were introduced separately into the extruder 114 where they were reduced to a molten state. The molten materials were extruded as a 3-ply hollow laminate at a temperature slightly above 225° C. (437° F.). The melting point of ECDEL is 225° C. (437° F.). MXSTEN and the adhesive TIE BOND melt at much lower temperatures.

The hollow laminate following extrusion had an outside diameter of about 0.5 inch (about 12.7 mm). The MXSTEN ply had an outside diameter of about 0.3 inch (about 7.62 mm). The thickness of the adhesive layer was about 0.05 inch (about 1.27 mm), and that of the outer ECDEL layer about 0.15 inch (about 3.81 mm).

The corrugator had a linear speed of about 60'/min, and a forward run of about 4'. Expansion of the molten plastic laminate occurred in about the first few inches of travel; i.e., in about the first second following extrusion, while the plastics were still molten. The molds had an interior configuration identical to the exterior configuration of the boot seals of FIG. 1.

Referring to FIG. 1, the manufactured (expanded) boot seals 12 had a large end internal diameter of about 2 inches (about 47–50 mm), a small end internal diameter of about 0.66 inch (about 16.9 mm), and a corrugated intermediate section between the large and small ends. The corrugated intermediate section had an outside diameter (peak-to-peak) of about 2.5 inches (about 63.4 mm) for most of its length except where tapered at the end closest to the boot seal small end.

The distance between the peaks and valleys in the corrugated intermediate section, and also in the tapered area, was about 0.5" (about 13.4 mm). This means that the boot seal laminate was expanded in the corrugator 118 (FIG. 4) while molten about 400% for most of its length, and to a minimum of about 130% at the boot seal small end.

The following Table gives approximate boot seal wall thicknesses at various points along the length of each seal.

TABLE 1

|  | mm | INCH |
|---|---|---|
| Small end | 3 | .012 |
| Corrugations near small end | 2.3 | 0.9 |
| Corrugations in intermediate area | 1.7 | 0.7 |
| Large end | 1.9 | 0.7 |

The reduced wall thicknesses of the expanded boot seal result primarily from the diametrical expansion in the corrugator but also from some longitudinal lengthening, particularly near the small end. The reductions in wall thicknesses were greater in the areas of higher expansion.

The molds of the corrugator functioned as a heat sink in the corrugator forward run. The continuous extruded laminate had a temperature of about 180°–200° F. at the time the molds were opened and the extruded laminate was expelled from the corrugator. At this temperature, the laminate was self-supporting, and was cooled in air to about 130° F., at which point the extruded laminate was cut into about 10 inch lengths suitable for use in the apparatus of FIG. 2.

The manufactured boot seals have a flexural modulus which is about the same as that of ECDEL, about 21,750 psi, well below the parameter of 100,000 psi, and a percent elongation to break which is about the same as that of ECDEL, about 400, well above the parameter of 100.

These data illustrate the excellent flex and elongation properties of boot seals made according to the present invention.

At the same time, the boot seals have excellent toughness imparted primarily by the expansion of the ECDEL ply, but also by the added boot seal thickness provided by the MXSTEN ply. As indicated above, MXSTEN stretch-toughens as does ECDEL. This improved toughness is illustrated in Examples 2–4.

EXAMPLES 2–4

Corrugated tubular laminates were mold formed. The outer ply of each corrugated laminate contained an amount of ECDEL. The corrugated laminates were laboratory assembled and then laboratory stretched (at ambient temperature) to evaluate the effect of stretch. They were tested for strength using the puncture resistance test.

As shown in the following Table 2, both plies of the laminates contained amounts of MXSTEN. The purpose of this was to observe certain properties unrelated to the scope of the present invention.

The stretch procedure was carried out so that in the valleys of the corrugations, the stretch was about 20%. At the peaks of the corrugations, the stretch was about 320%.

Comparative data were obtained on mold formed samples composed of SANTOPRENE. The comparative samples were not laminates and were not stretched as SANTO-PRENE does not stretch-toughen.

The tubular samples of the present invention had the following compositions and ply-dimensions prior to stretching.

TABLE 2

Construction of MXSTEN/ECDEL Laminates

| Ex. | Composition of outer ply[a] | Ply Thickness | Composition of Inner Ply | Ply Thickness |
| --- | --- | --- | --- | --- |
| 2 | 50% MXSTEN 50% ECDEL | 0.015" (0.368 mm) | 100% MXSTEN | 0.030" (0.735 mm) |
| 3 | 90% MXSTEN 10% ECDEL | 0.015" (0.368 mm) | 100% MXSTEN | 0.030" (0.735 mm) |
| 4 | 50% MXSTEN[b] 30% ECDEL | 0.015" (0.368 mm) | 100% MXSTEN | 0.030" (0.735 mm) |

The plies in Examples 2, 3 and 4 were bonded together by Mitsui Chemical Company adhesive ADMER QB502A.

The following test data were obtained. The data given in the following Table 3 are average data obtained from six samples in each Example.

TABLE 3

Puncture Resistance (PR of MXSTEN/ECDEL Laminates)

| | 20% Stretch | | 320% Stretch | |
| --- | --- | --- | --- | --- |
| Example | Tmm[c] | PR N/mm | Tmm | PR N/mm |
| 2 | 1.13 | 56 | 0.43 | 150 |
| 3 | 1.19 | 52 | 0.48 | 128 |
| 4 | 1.14 | 53 | 0.47 | 129 |
| SANTOPRENE | 1.6 | 39.9 | 1.6 | 39.9 |

Even moderate stretching of samples in which a ply contains ECDEL (e.g., 20%) achieves an improvement in
[a]%'s by weight.
[b]Example 4 contained 20% mineral filler dispersed through the outer ply.
[c]Tmm is the average laminate wall thickness following expansion. In the case of SANTOPRENE, Tmm is the wall thickness of the samples tested.

puncture resistance (PR) compared to SANTOPRENE. Substantial stretching (e.g., 320%) achieves a dramatic increase in puncture resistance. Example 2 in which the outer ply was 50% ECDEL provided better puncture resistance than Examples 3 and 4 which contained 10% and 30% ECDEL respectively.

EXAMPLE 5

An advantage of the present invention is that the boot seal 12 of the present invention is resistant to dimensional changes induced by temperature. Conventional stretch-strengthenable plastics which have been stretched tend to shrink when exposed to high temperatures. Power steering linkages, and the boots installed to protect the linkages, get hot. The temperature can reach 175° C. The amount of shrink caused by high temperatures can cause the boots made of many plastics to interfere with the ball joints and/or other linkages over which they are installed. Interference between the boot and linkage protected by the boot likely accounts for a percentage of the failure modes observed with prior art boots.

Samples of boots made in accordance with the present invention were exposed to different temperature for different periods of time. The outside diameter of the boots was measured by laser beam. The results are given in the following Table.

TABLE 4

Heating Times/Temperatures Effect On ECDEL Containing Boot Diameter

| Time, Seconds | Temperature, ° C. | O.D., mm |
| --- | --- | --- |
| 0 | Ambient | 57.49 |
| 10 | 120 | 57.58 |
| 30 | 120 | 57.56 |
| 60 | 120 | 57.62 |
| 10 | 131 | 57.61 |
| 30 | 131 | 57.63 |
| 10 | 190 | 57.59 |

From Table 4, it can be seen that the boots of the present invention are very heat-stable and did not to distort from heat-induced shrinkage.

Advantages of the present invention should be apparent. Primarily, the use of a stretch-toughenable polyester thermoplastic elastomer which has a flexural modulus of at least 100,000 psi and a percent elongation to rupture of at least 100 provides a boot seal having greatly improved properties, particularly puncture resistance, compared to SANTO-PRENE. Preferably, the resin is stretch-toughened to a puncture resistance of at least 50 Newtons/mm of boot seal wall thickness. By using a stretch-toughenable polyester resin such as ECDEL, the stretch-toughened boot seal additionally is resistant to temperature induced shrinkage and thus failures caused by interference of the boot seal with the linkage being protected. Further, a polyester resin such as ECDEL advantageously can be extruded and vacuum molded in a continuous process such as that described with reference to FIGS. 4–8. This dramatically reduces the cost of manufacture compared to conventional blow molding procedures which are batch procedures.

By using the stretch-toughenable polyester resin as the outer ply in a laminated structure, wherein the inner ply is an extrudable resin which is softer than the polyester resin, a boot seal is obtained which is both strong and readily sealable with the linkage being protected.

EXAMPLE 6

An embodiment of the present is illustrated in FIG. 7B. FIG. 7B illustrates an extruder head 214 of an extruder die 216 positioned in a mold cavity 218. The extruder head 214 is adapted for the co-extrusion of two-layers, an inner ply and outer ply. Instead of two layers, the extruder head 214 can be readily adapted for the extrusion of three layers which include an intermediate bonding layer between the inner and outer plies.

The extruder head 214 includes a nozzle 220. The nozzle has a cylindrical side wall 222 that extends from the die block (not shown) of the extruder die 216 along a central axis 224 to an open end 226. The cylindrical side wall 222 has a cylindrical inner surface 228 and a beveled surface 230 at the open end 226 of the cylindrical side wall 222.

An outer mandrel 232 is located in substantially coaxial relationship within the cylindrical side wall 222 and is spaced from the cylindrical side wall 222. The outer mandrel 232 has a tube portion 234, a cone portion 236, and a flange portion 238. The tube portion 234 extends from the cone portion 236 of the outer mandrel 232 to the flange portion 238. The tube portion 234 has an outer cylindrical surface 240 and an inner cylindrical surface 242. The outer cylindrical surface 240 of the tube portion 234 and the inner cylindrical surface 228 of the cylindrical side wall 222 define a first passageway 244 through which a first molten plastic stream flows from feed ports (not shown) of the extruder die 216. The inner cylindrical surface 242 of the tube portion 234 of the outer mandrel 232 defines a second passageway 246 through which a second molten plastic stream flows from feed ports (not shown) of the extruder die 216.

The cone portion 236 of the outer mandrel 232 extends through the open end 226 of the cylindrical side wall 222. The cone portion 236 of the outer mandrel 232 has an outer frustoconical surface 248 and an inner frustoconical surface 250. The outer frustoconical surface 248 of the outer mandrel 232 and beveled surface 230 of the cylindrical side wall 222 define a first annulus 252. The first annulus 252 is in communication with the first passageway 244 so that, during extrusion, the first molten plastic stream that is in the first passageway 244 flows from the first passageway 244 through the first annulus 252.

The flange portion 238 of the outer mandrel 232 is connected to a first actuating means 260 that oscillates the outer mandrel 232 axially (left and right directions as shown in FIG. 7B) relative to the cylindrical side wall 222. The first actuating means 260 can be any actuating means known in the art such as a pneumatic pressure cylinder mechanism.

Oscillation of the outer mandrel 232 causes the gap of the first annulus 252 to increase or decrease. As the first molten plastic stream passes from the first passageway 244 through the increasing and decreasing gap of the first annulus 252, an outer ply 262 (FIG. 7C) is formed with a variable annular thickness. The outer ply 262 has alternating thinner regions 262a and thicker regions 262b.

The extruder head 214 further includes an inner conical shaped mandrel 266 that is located in substantially coaxial relationship within the cone portion 236 of the outer mandrel 232 and is spaced from the inner frustoconical surface 250 of the outer mandrel 232. The inner conical shaped mandrel 266 is attached to rod 268 that extends in a coaxial relationship through the tube portion 234 of the outer mandrel 232. The inner conical shaped mandrel 266 has a conical outer surface 270. The conical outer surface 270 of the inner surface 250 of the outer mandrel 232 define a second annulus 274. The second annulus 274 is in communication with the second passageway 246 so that during extrusion, the second molten plastic stream in the second passageway 246 flows from the second passageway 246 through the second annulus 274 and forms an inner ply 276.

The rod 268 is connected to a second actuating means 278 that oscillates the inner conical shaped mandrel 266. The second actuating means 278 oscillates the inner conical shaped mandrel 266 axially (left and right directions as shown in FIG. 7B) relative to the outer mandrel 232. The second actuating means 278 can be any actuating means 278 known in the art such as a pneumatic pressure cylinder mechanism.

Oscillation of the inner conical shaped mandrel 266 causes the gap of the second annulus 274 to increase or decrease. As the second molten plastic stream passes from the second passageway 246 through the increasing and decreasing gap of the second annulus 274, the inner ply 276 (FIG. 7C) is formed with a variable annular thickness. The inner ply 276 has alternating thinner regions 276a and thicker regions 276b.

The outer ply 262 and the inner ply 276 are extruded from the first annulus 252 and second annulus 274, respectively, into the mold cavity 218. During co-extrusion of the outer ply 262 and the inner ply 276, the oscillations of the outer mandrel 232 and the oscillations of the inner conical shaped mandrel 266 are synchronized. By synchronizing the oscillations of outer mandrel 232 and oscillations of the inner conical shaped mandrel 266, the outer ply 262 and the inner ply 276 are extruded with the thicker regions 262b of the outer ply 262 radially aligned with the thicker regions 276b of the inner ply 276. During co-extrusion, the oscillations of the outer mandrel 232 and the oscillations of the inner conical shaped mandrel 266 are also synchronized with the linear speed of the mold blocks 284 that travel along the inner track (not shown) of the corrugator. By synchronizing the oscillations of the outer mandrel 232 and inner conical shaped mandrel 266 with the linear speed of the mold blocks 284, the thicker regions 262b and 276b of the outer ply 262 and inner ply 276 can be radially aligned with the valleys 288 of the corrugated inner walls 290 of the mold blocks 284.

FIG. 7C shows the extruded inner ply 276 and outer ply 262 in the mold cavity 218 prior to a vacuum being drawn in the mold cavity 218. The thicker regions 262b of the outer ply 262 are in contact with the thicker regions 276b of the inner ply 276, and the thinner regions 262a of the outer ply 262 are in contact with the thinner regions 276a of the inner ply 276. The thicker regions 276b and 262b of the inner ply 276 and the outer ply 262 are radially aligned with the valleys 288 of the corrugated inner wall 290, and the thinner regions 276a and 262a of the inner ply 276 and the outer ply 262 are radially aligned with the peeks 292 of the corrugated inner wall 290.

After the outer ply 262 and the inner ply 276 are extruded into the mold cavity 218, a vacuum is drawn in the corrugated inner wall 290 of mold block 284. The extruded outer ply 262 and inner ply 276 expand radially against the peaks 292 and valleys 288 of the corrugated inner wall 290. The wall thicknesses of the outer ply 262 and inner ply 276 decrease as the outer ply 262 and inner ply 276 expand against the peaks 292 and valleys 288 of the corrugated inner wall 290. The degree of expansion of the outer ply 262 and inner ply 276 is greater along the valleys 288 of the corrugated inner wall 290 and less along the peaks 292 of the corrugated inner wall 290. Hence, the wall thicknesses of the outer ply 262 and inner ply 276 along the valleys 288 of the corrugated inner wall 290 is thinned more than the wall thicknesses of the outer ply 262 and inner ply 276 along the peaks 292 of the corrugated inner wall 290.

The wall thicknesses of the expanded outer ply 262 and inner ply 276 are shown in FIG. 7D. FIG. 7D shows that outer ply 262 and the inner ply 276 have uniform wall thicknesses longitudinally in the peaks 292 and valleys 288 along the corrugated inner wall 290.

The advantage of this aspect of the method of FIGS. 7B, 7C, and 7D is that the method provides a better means of control towards achieving more uniform or desired flexural, elongation, and strength properties longitudinally along the length of the boot seal.

Although the extruder head 214 in Example 6 is illustrated with two actuating means that oscillate both the outer mandrel 232 and the inner conical 266 shaped mandrel, the extruder head 214 may have only one actuating means that oscillates the outer mandrel or the inner conical shaped mandrel.

From the above description of the invention, those skilled in the art will perceive improvements, changes and modifications. Such improvements, changes and modifications within the skill of the art are intended to be covered by the appended claims.

Having described the invention, the following is claimed:

1. A boot seal for use in sealing a joint including first and second relatively movable parts, said boot seal comprising:
   a sleeve configured to extend between and around said first and second relatively movable parts and having a laminate wall comprising at least two layers of plastic material which are bonded together;
   at least one of said layers being a stretched-toughenable polyester thermoplastic elastomer which has been diametrically stretched an amount effective to increase the toughness of said at least one of said layers;
   said laminate wall having a percent elongation to rupture of at least 100 and a flexural modulus less than 100,000 psi.

2. The boot seal of claim 1 wherein said laminate wall has a puncture resistance of at least 50 Newtons/mm wall thickness.

3. The boot seal of claim 2 wherein said at least one of said layers is a stretch-toughenable polyester material resistant to dimensional change when exposed to heat.

4. The boot seal of claim 2 wherein said sleeve is a laminate of a first outer layer formed of a stretch-toughened polyester material and a second inner layer formed of an extrudable thermoplastic elastomer, said thermoplastic elastomer of the second inner layer having a higher degree of flexibility and softness than said polyester material, said polyester material being tougher and having a greater resistance to hydrocarbon chemicals than the thermoplastic elastomer of the second inner layer.

5. The boot seal of claim 4 wherein the thermoplastic elastomer of the second inner layer is a polyolefin.

6. The boot seal of claim 2 wherein said sleeve wall is a laminate of at least two layers formed of said polyester elastomer, wherein the inner of said layers is blown.

7. The boot seal of claim 2 wherein said laminate wall is a co-extruded laminate.

8. The boot seal of claim 7 comprising a third intermediate layer of thermoplastic adhesive material co-extruded with said first and second layers.

9. The boot seal of claim 8 stretched while in a molten state.

10. The boot seal of claim 9 stretched at least 200%.

11. The boot seal of claim 10 wherein said sleeve is corrugated.

12. The boot seal of claim 11 comprising ends of different diameter.

13. The boot seal of claim 8 wherein said sleeve has a wall thickness in the range of about 0.6 mm to about 2 mm.

14. The boot seal of claim 2 where said polyester is the condensation product of the trans isomer of 1,4-dimethyl-cyclohexanedicarboxylate units, of cyclo-hexane dimethanol units, and hydroxy terminated polytetramethylene ether glycol units.

15. The boot linkage comprising relatively movable parts and the boot seal of claim 1.

16. A boot seal for use in sealing a joint including first and second relatively movable parts, said boot seal comprising:
   a hollow sleeve configured to extend between and around said first and second relatively movable parts and having a laminate wall comprising at least two layers of plastic material which are bonded together;
   at least one of said layers being a stretched-toughenable polyester thermoplastic elastomer which has been diametrically stretched an amount effective to increase the toughness of said one layer;
   said sleeve wall having a percent elongation to rupture of at least 100 and flexural modulus less than 100,000 psi;
   said diametrical stretching being performed by co-extrusion of coaxial layers of plastic continuously into a mold cavity defined by a moving series of molds.

17. The boot seal of claim 16 wherein said coaxial layers are vacuum expanded in said mold cavity and then cooled while confined within the mold cavity.

18. An apparatus comprising:
   a sleeve having a laminate wall comprising at least two layers of plastic material which are bonded together; and
   at least one of said layers being stretch toughenable polyester thermoplastic elastomer which has been diametrically stretched an amount effective to increase the toughness of said layer;
   said laminate wall having a percent elongation to rupture of at least 100 and a flexural modulus less than 100,000 psi.

19. The apparatus of claim 18 wherein another of said layers is a thermoplastic elastomer having a higher degree of flexibility and softness than said polyester thermoplastic elastomer, said polyester thermoplastic elastomer being tougher and having a greater resistance to hydrocarbon chemicals than the thermoplastic elastomer of said another layer.

20. The apparatus of claim 19 wherein said thermoplastic elastomer of said another layer is a polyolefin.

21. An apparatus comprising:
   a hollow sleeve having a laminate wall comprising at least two layers of plastic material which are bonded together;
   at least one of said layers being a stretch toughenable polyester thermoplastic elastomer which has been diametrically stretched an amount effective to increase the toughness of said one layer.

22. An apparatus as defined in claim 21 wherein, said sleeve wall having a percent elongation to rupture of at least 100 and a flexural modulus less than 100,000 psi.

* * * * *